United States Patent
Kline et al.

(10) Patent No.: US 10,175,650 B2
(45) Date of Patent: Jan. 8, 2019

(54) DYNAMIC HOLOGRAM PARAMETER CONTROL

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/406,979

(22) Filed: Jan. 16, 2017

(65) Prior Publication Data
US 2018/0203410 A1    Jul. 19, 2018

(51) Int. Cl.
| | | |
|---|---|---|
| *G03H 1/00* | (2006.01) | |
| *G06F 3/01* | (2006.01) | |
| *G09G 5/10* | (2006.01) | |
| *G09G 5/14* | (2006.01) | |

(52) U.S. Cl.
CPC ........... *G03H 1/0005* (2013.01); *G06F 3/013* (2013.01); *G09G 5/10* (2013.01); *G09G 5/14* (2013.01); *G03H 2001/0061* (2013.01); *G03H 2226/02* (2013.01); *G03H 2226/05* (2013.01); *G03H 2240/21* (2013.01); *G09G 2320/0686* (2013.01); *G09G 2340/12* (2013.01); *G09G 2354/00* (2013.01)

(58) Field of Classification Search
CPC ......... G03H 1/0005; G03H 2001/0061; G03H 2226/02; G03H 2226/05; G03H 2240/21; G06F 3/013; G09G 2320/0686; G09G 2340/12; G09G 2354/00; G09G 5/10; G09G 5/14
USPC ..................................... 463/3; 345/156, 690
See application file for complete search history.

(56) References Cited

U.S. PATENT DOCUMENTS

| | | | |
|---|---|---|---|
| 2005/0256101 A1 | 12/2005 | Garner et al. | |
| 2005/0286101 A1 | 12/2005 | Garner et al. | |
| 2015/0070470 A1* | 3/2015 | McMurrough | ......... G06F 3/013 348/46 |
| 2016/0025982 A1 | 1/2016 | Sutherland et al. | |
| 2016/0077489 A1 | 3/2016 | Kaufman et al. | |

(Continued)

OTHER PUBLICATIONS

Bauhaus-University Weimar, [online];[retrieved on Jan. 16, 2017];retrieved from Internet, www.uni-weimar.de/medien/AR, Oliver Bimber et al., "Interacting with augmented holograms", In proceedings of SPIE Conference on Practical Holography XIX: Materials and Applications, Jan. 2005.

*Primary Examiner* — Tony Davis
(74) *Attorney, Agent, or Firm* — Cantor Colburn LLP

(57) ABSTRACT

Systems, methods, and computer-readable media are disclosed for controlling parameters of a holographic image. A gaze direction of a user is detected and user interaction data indicative of the gaze direction of the user is generated. A determination is then made using the user interaction data that the gaze direction of the user at least partially coincides with an object of interest. A further determination is made that the object of interest is at least partially obscured by the holographic image. One or more of the parameters of the holographic image are then adjusted to enhance visibility of the object of interest to the user.

17 Claims, 10 Drawing Sheets

(56) References Cited

U.S. PATENT DOCUMENTS

2016/0109940 A1* 4/2016 Lyren .................. H04W 4/023
463/2

* cited by examiner

DYNAMIC HOLOGRAM PARAMETER CONTROL

BACKGROUND

A hologram may be a photographic recording of a light field and may be used to display a fully three-dimensional image of an object. A hologram may be seen without the aid of special glasses or other intermediate optics. More specifically, a hologram may be an encoding of a light field as an interference pattern of variations in opacity, density, or surface profile of a medium (e.g., air, holographic film, etc.). When suitably lit, the interference pattern diffracts the light into a reproduction of the original light field, and objects present in the original light field appear to be present in the reproduction, exhibiting visual depth cues such as parallax and perspective that change realistically with a change in the relative position of an observer.

SUMMARY

In one or more other example embodiments of the disclosure, a method for controlling parameters of a holographic image is disclosed. The method includes detecting a gaze direction of a user; generating user interaction data indicative of the gaze direction of the user; determining, based at least in part on the user interaction data, that the gaze direction of the user at least partially coincides with an object of interest; determining that the object of interest is at least partially obscured by the holographic image; and adjusting one or more of the parameters of the holographic image to enhance visibility of the object of interest to the user.

In one or more other example embodiments of the disclosure, system for controlling parameters of a holographic image is disclosed. The system includes at least one memory storing computer-executable instructions and at least one processor configured to access the at least one memory and execute the computer-executable instructions to perform a set of operations. The operations include detecting a gaze direction of a user; generating user interaction data indicative of the gaze direction of the user; determining, based at least in part on the user interaction data, that the gaze direction of the user at least partially coincides with an object of interest; determining that the object of interest is at least partially obscured by the holographic image; and adjusting one or more of the parameters of the holographic image to enhance visibility of the object of interest to the user.

In one or more other example embodiments of the disclosure, a computer program product for controlling parameters of a holographic image is disclosed that includes a non-transitory storage medium readable by a processing circuit, the storage medium storing instructions executable by the processing circuit to cause a method to be performed. The method includes detecting a gaze direction of a user; generating user interaction data indicative of the gaze direction of the user; determining, based at least in part on the user interaction data, that the gaze direction of the user at least partially coincides with an object of interest; determining that the object of interest is at least partially obscured by the holographic image; and adjusting one or more of the parameters of the holographic image to enhance visibility of the object of interest to the user.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the disclosure include, among other things, systems, methods, computer-readable media, techniques, and methodologies for generating a holographic masking surface to obscure content displayed on a user device from the view of third parties. Example embodiments of the disclosure also include, among other things, systems, methods, computer-readable media, techniques, and methodologies for adjusting one or more parameters of a holographic image that at least partially obscures an object of interest to enhance visibility of the object of interest to a user. Example embodiments of the disclosure also include, among other things, systems, methods, computer-readable media, techniques, and methodologies for utilizing holographic images to represent a digital object transfer. It should be appreciated that the terms hologram, holographic image, or the like may be used interchangeably herein.

Figure 1:
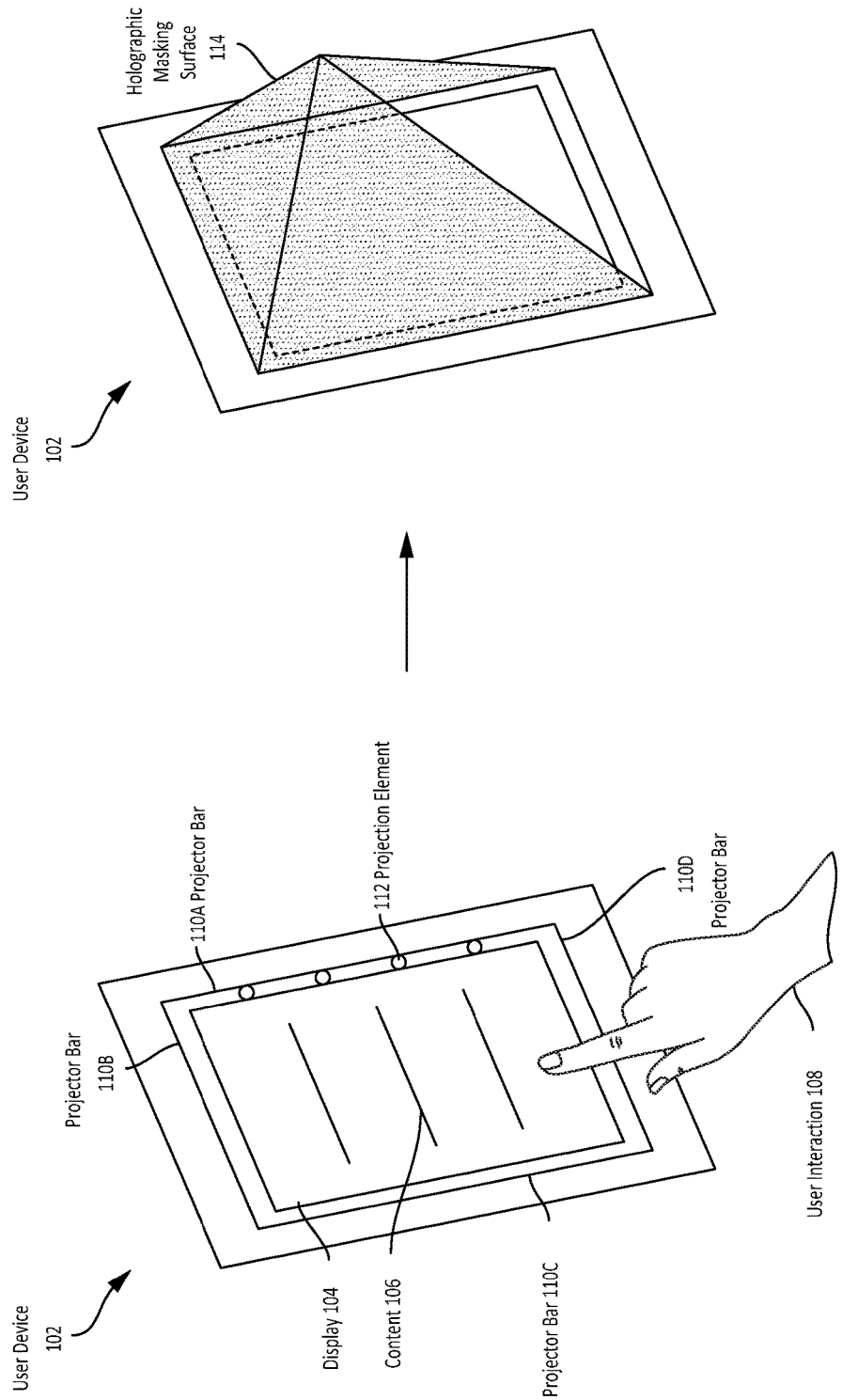
FIG. 1 is a schematic diagram illustrating the generation of a holographic masking surface in accordance with one or more example embodiments of the disclosure.
Figure 2:
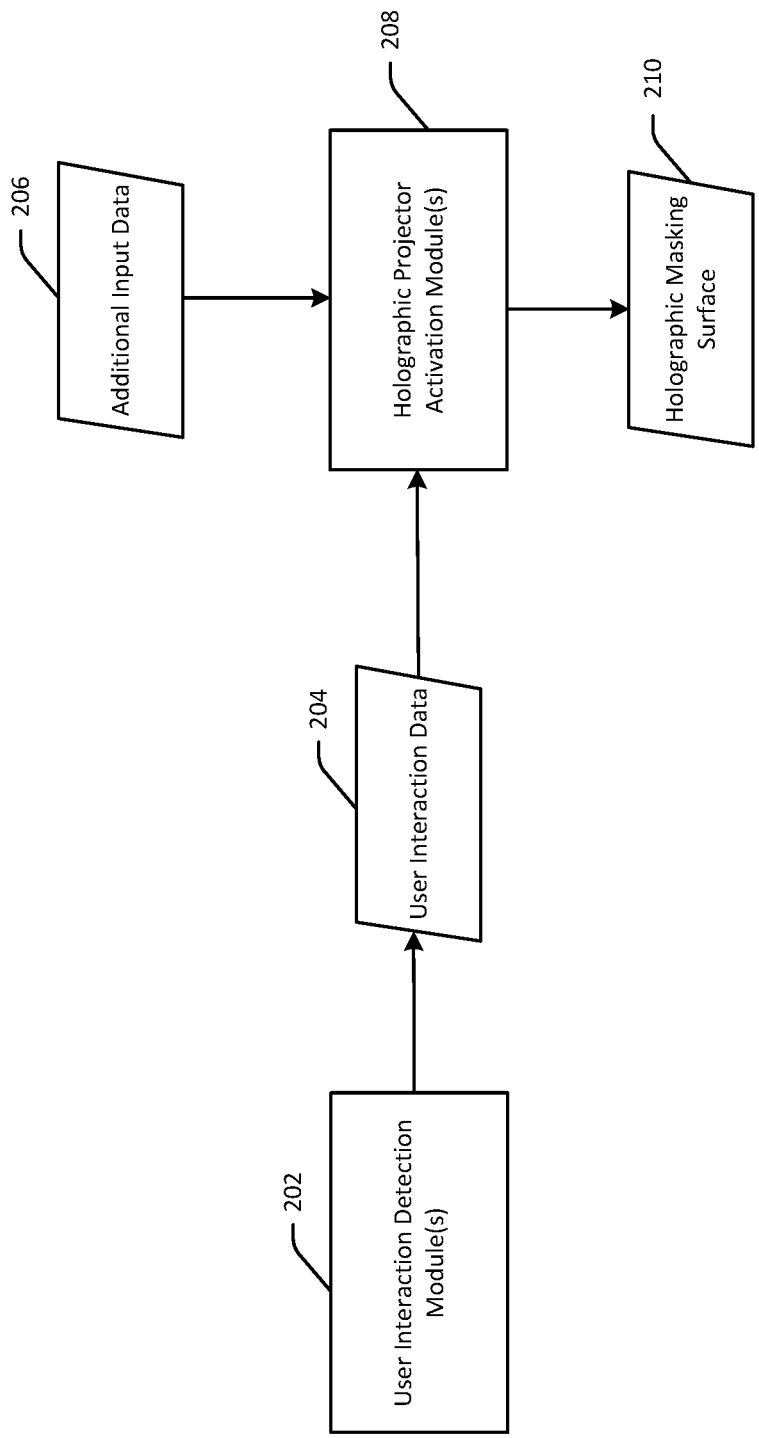
FIG. 2 is a schematic block diagram illustrating example components for generating a holographic masking surface in accordance with example embodiments of the disclosure.
Figure 3:
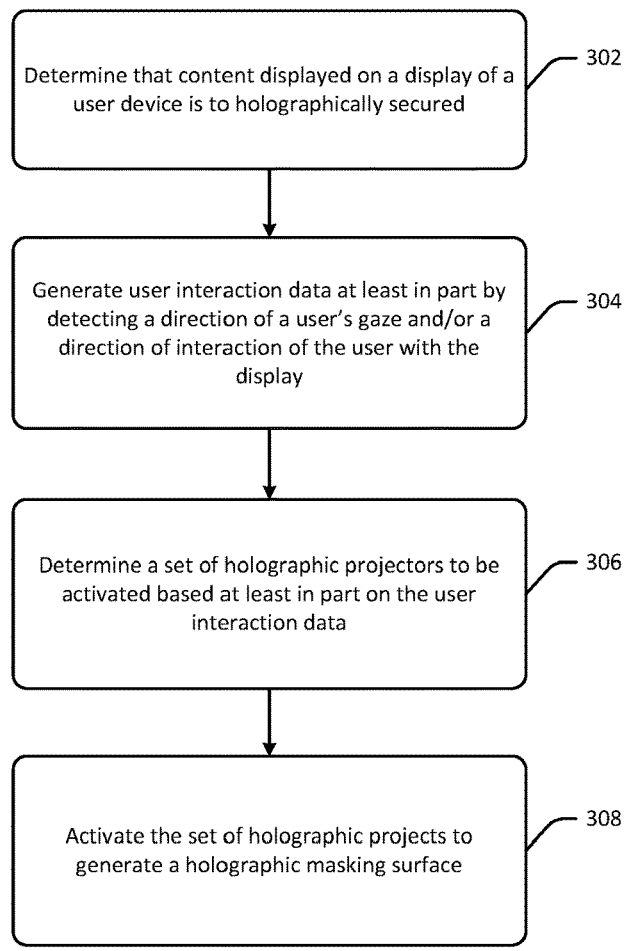
FIG. 3 is a process flow diagram of an illustrative method for generating a holographic masking surface in accordance with one or more example embodiments of the disclosure.

FIG. 1 is a schematic diagram illustrating the generation of a holographic masking surface in accordance with one or more example embodiments of the disclosure. FIG. 2 is a schematic block diagram illustrating example components for generating a holographic masking surface in accordance with example embodiments of the disclosure. FIG. 3 is a process flow diagram of an illustrative method 300 for generating a holographic masking surface in accordance with one or more example embodiments of the disclosure. FIGS. 1-3 will be described hereinafter in conjunction with one another.

Figure 4:
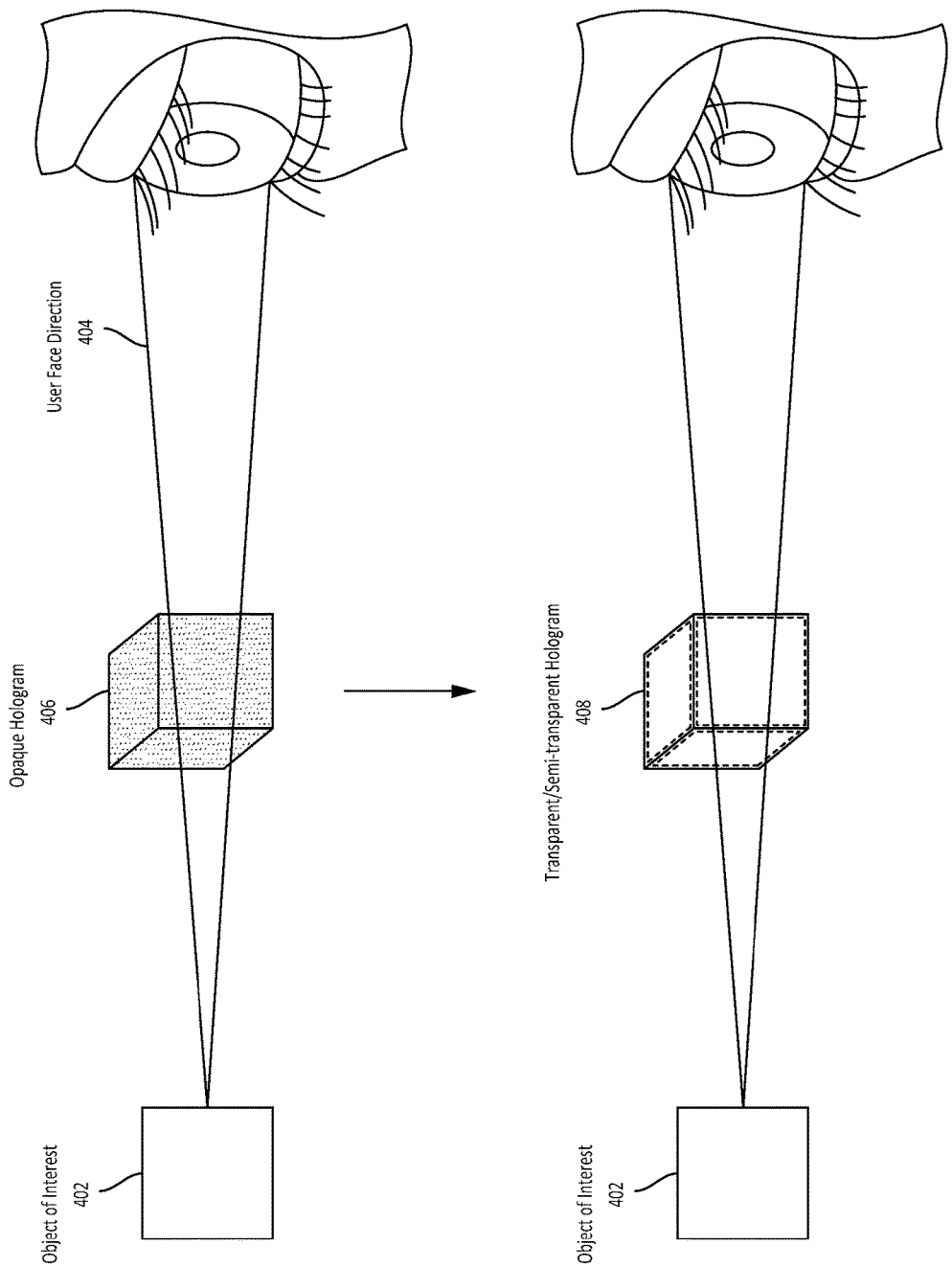
FIG. 4 is a schematic diagram illustrating the adjustment of one or more parameters of a holographic image to enhance visibility of an object of interest to a user in accordance with one or more example embodiments of the disclosure.
Figure 5:
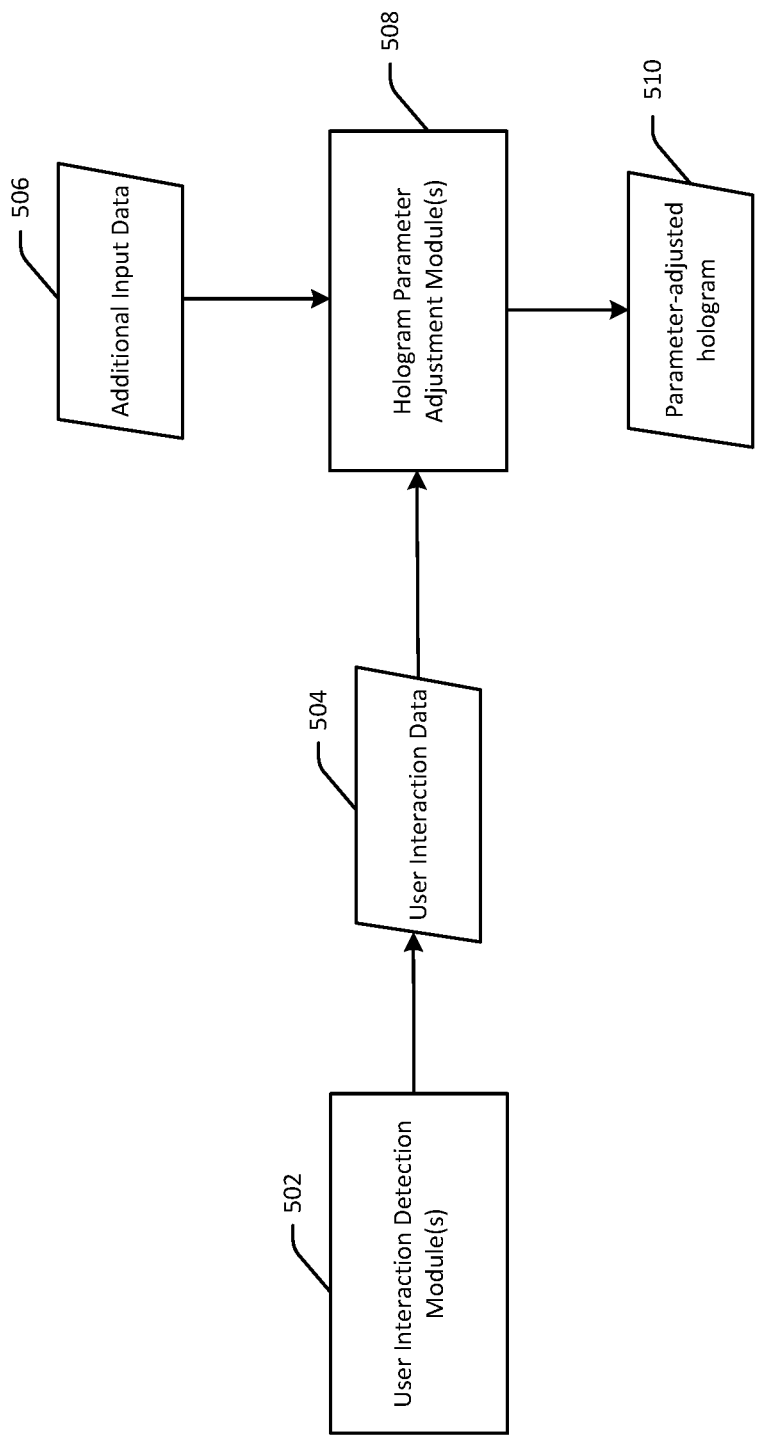
FIG. 5 is a schematic block diagram illustrating example components for adjusting one or more parameters of a holographic image to enhance visibility of an object of interest to a user in accordance with example embodiments of the disclosure.
Figure 6:
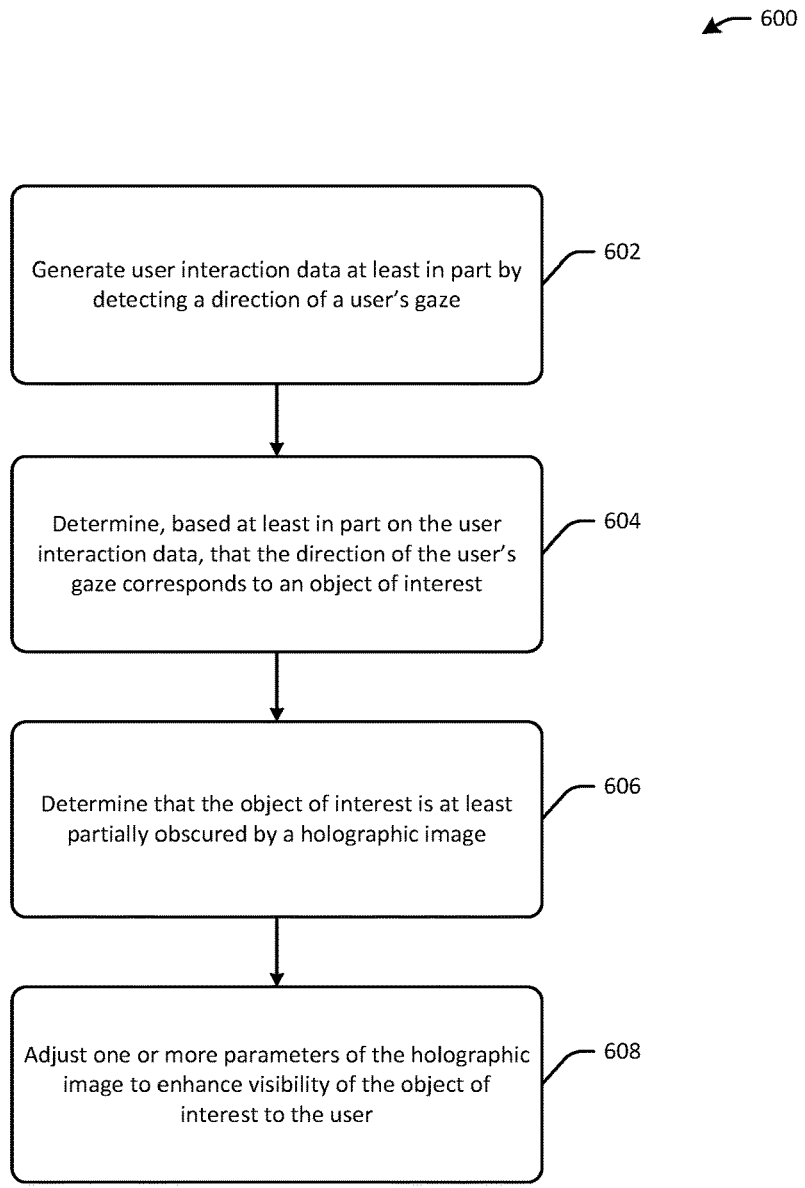
FIG. 6 is a process flow diagram of an illustrative method for adjusting one or more parameters of a holographic image to enhance visibility of an object of interest to a user in accordance with one or more example embodiments of the disclosure.

FIG. 4 is a schematic diagram illustrating the adjustment of one or more parameters of a holographic image to enhance visibility of an object of interest to a user in accordance with one or more example embodiments of the disclosure. FIG. 5 is a schematic block diagram illustrating example components for adjusting one or more parameters of a holographic image to enhance visibility of an object of interest to a user in accordance with example embodiments of the disclosure. FIG. 6 is a process flow diagram of an illustrative method 600 for adjusting one or more parameters of a holographic image to enhance visibility of an object of interest to a user in accordance with one or more example embodiments of the disclosure. FIGS. 4-6 will be described hereinafter in conjunction with one another.

Figure 7:
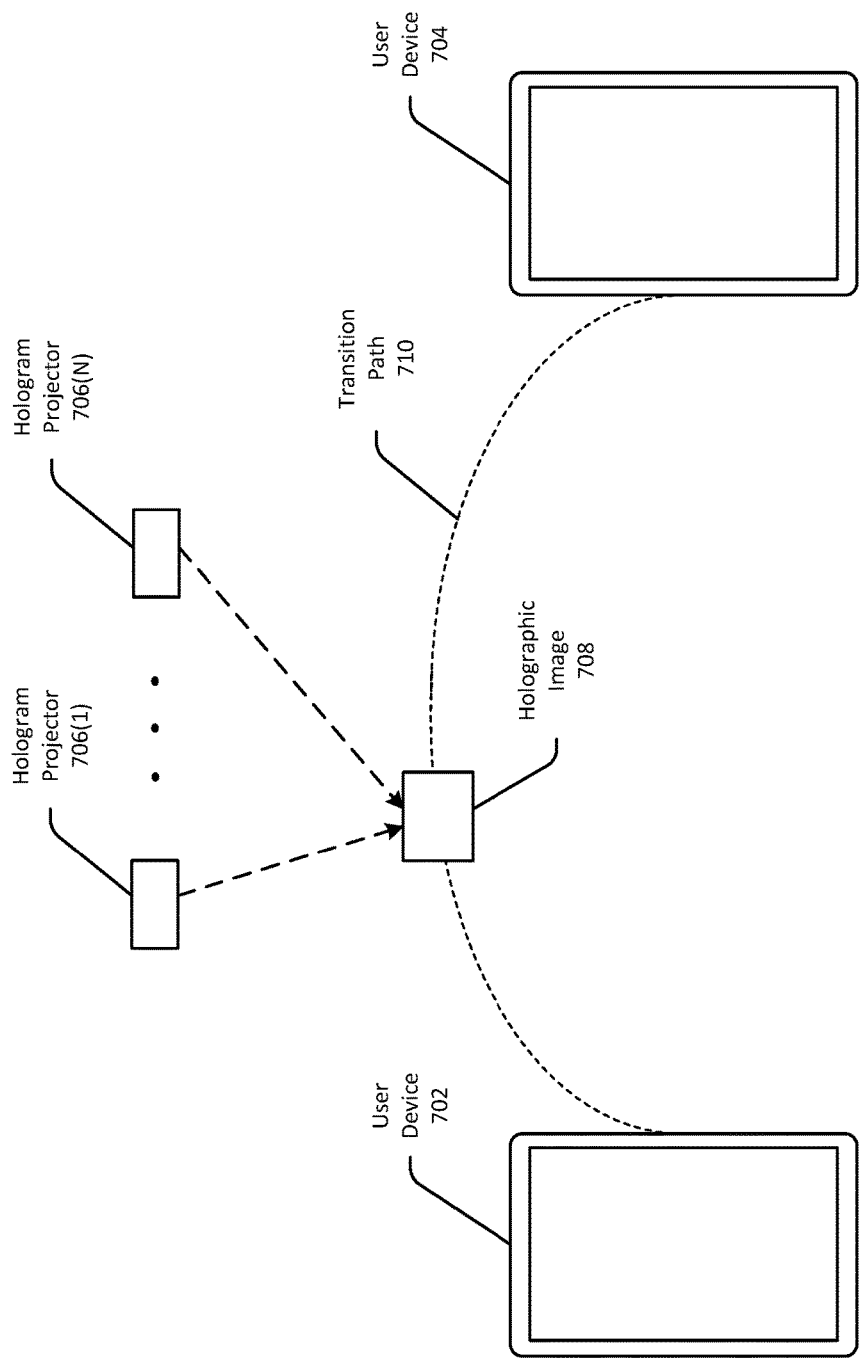
FIG. 7 is a schematic diagram illustrating the use of holographic images to represent a digital object transfer in accordance with one or more example embodiments of the disclosure.
Figure 8:
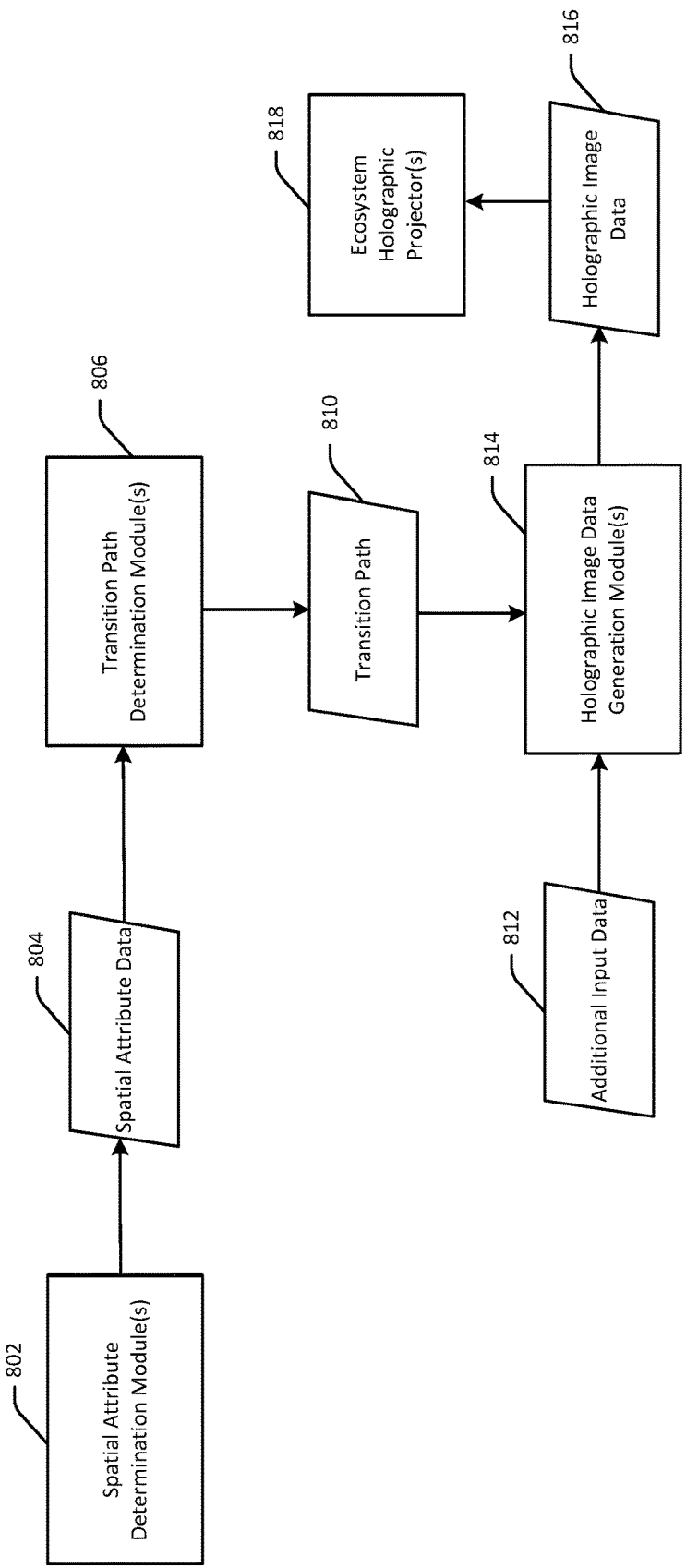
FIG. 8 is a schematic block diagram illustrating example components for utilizing holographic images to represent a digital object transfer in accordance with example embodiments of the disclosure.
Figure 9:
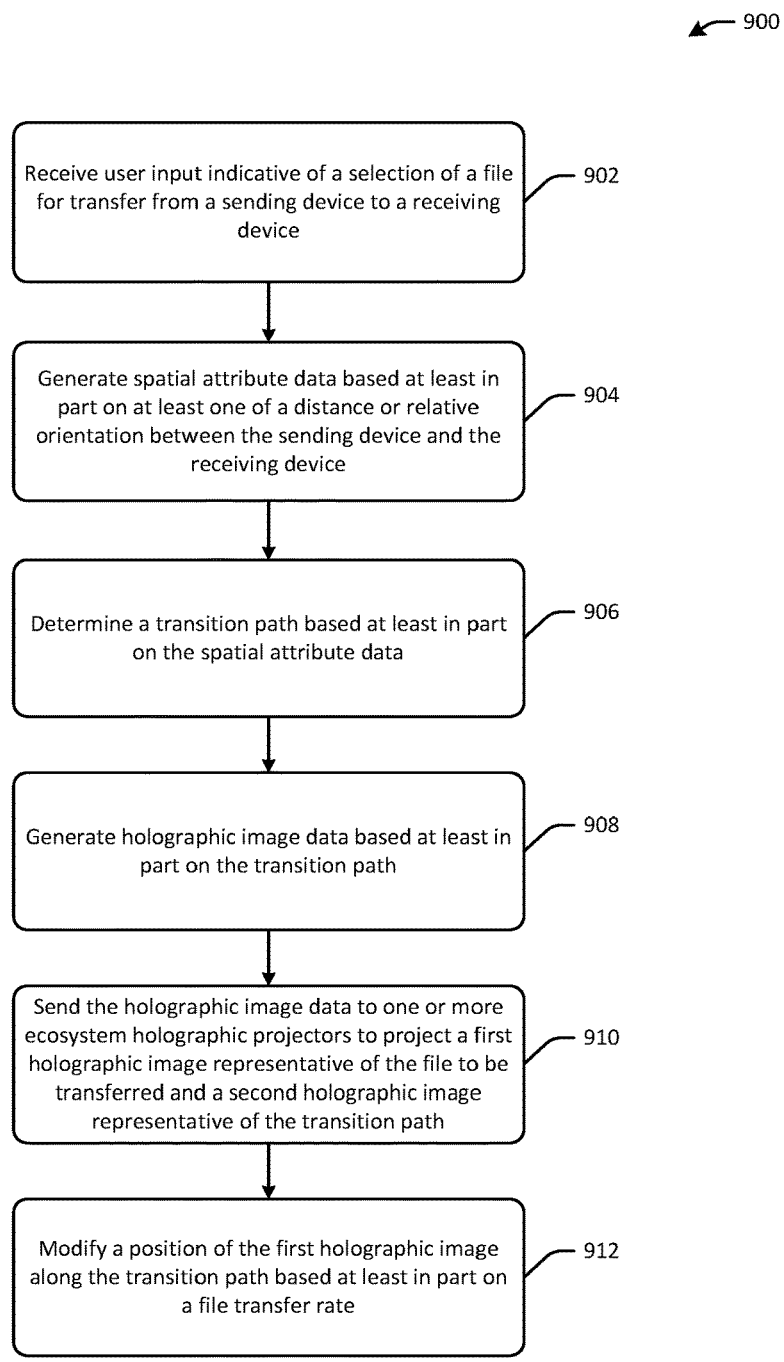
FIG. 9 is a process flow diagram of an illustrative method for utilizing holographic images to represent a digital object transfer in accordance with one or more example embodiments of the disclosure.

FIG. 7 is a schematic diagram illustrating the use of holographic images to represent a digital object transfer in accordance with one or more example embodiments of the disclosure. FIG. 8 is a schematic block diagram illustrating example components for utilizing holographic images to represent a digital object transfer in accordance with example embodiments of the disclosure. FIG. 9 is a process flow diagram of an illustrative method 900 for utilizing holographic images to represent a digital object transfer in accordance with one or more example embodiments of the disclosure. FIGS. 7-9 will be described hereinafter in conjunction with one another.

Each operation of any of the methods 300, 600, or 900 may be performed by one or more components that may be implemented in any combination of hardware, software, and/or firmware. In certain example embodiments, one or more of these component(s) may be implemented, at least in part, as software and/or firmware that contains or is a collection of one or more program modules that include computer-executable instructions that when executed by a processing circuit cause one or more operations to be performed. A system or device described herein as being configured to implement example embodiments of the disclosure may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

As previously noted, example embodiments of the disclosure relate to generating a holographic masking surface to obscure content displayed on a user device from the view of third parties. FIG. 1 depicts an example user device 102. The user device 102 may be a smartphone, a tablet, a personal digital assistant, a personal computer, an electronic reader, or any other suitable electronic device capable of displaying digital content. The user device 102 may include a display 104, which may be a liquid-crystal display (LCD), a light-emitting diode (LED) display, an organic electroluminescent (OLED) display, or the like.

In an example scenario, a user may utilize the user device 102 in a public setting. In such a setting, information leakage is possible because content 106 being displayed on the display 104 of the user device 102 may at times be visible to third parties, who may not be authorized to view the content 106. The risk that the content 106 is visible to unauthorized third parties is particularly serious if the content 106 is of a confidential nature. In addition, various gestures made by a user of the user device 102 such as gesture-based patterns or PINs to unlock the user device 102 may be visible to unauthorized third parties.

While various conventional solutions exist for attempting to hide displayed content such as masking the content with dark colors, using a display cover, or the like, such conventional solutions suffer from a number of drawbacks including the inability to adequately hide a user's interaction with a device (e.g., gesture-based device unlocking) and the inability to automatically take measures to secure content from view of third parties based on a confidential nature of the content. Described herein are technical solutions that address these and other drawbacks.

Referring now to FIGS. 1-3 in conjunction with one another, at block 302 of the method 300, a determination may be made that the content 106 displayed on the display 104 of the user device 102 is to be holographically secured. This determination may be based on the nature of the content 106 being displayed. For example, the content 106 may be tagged with metadata that indicates the confidential nature of the content 106. The user device 102 may access this metadata and determine that the content 106 is to be holographically secured based on the metadata. In certain example embodiments, the user device 102 may provide a user with a selectable option to activate holographically securing of content based on associated metadata. In yet other example embodiments, the user device 102 may provide a user with the capability to select between a mode in which any content displayed on the display 104 is holographically secured and another mode in which only confidential content is holographically secured (or a non-secure mode in which no content is holographically secured). In such example embodiments, a user may select a mode based on whether the user is operating the user device 102 in a public setting.

At block 304 of the method 300, computer-executable instructions of one or more user interaction detection modules 202—which may reside, for example, on the user device 102 or on one or more servers communicatively coupled to the user device 102—may be executed to generate user interaction data 204. The user interaction data 204 may be generated at least in part by detecting a direction of a user's gaze and/or a direction of interaction 108 of the user with the display 104/user device 102.

For example, the user device 102 may include image sensors (e.g., cameras), proximity sensors, or the like that are configured to detect a gaze direction of a user of the user device 102 and/or a direction of interaction 108 of the user with the user device 102. As will be described in more detail later in this disclosure, the image sensors, proximity sensors, or the like may also be configured to detect a gaze direction of a third party located in proximity to the user device 102.

At block 306 of the method 300, computer-executable instructions of one or more holographic projector activation modules 208—which may reside, for example, on the user device 102 or on one or more servers communicatively coupled to the user device 102—may be executed to determine a set of holographic projectors to be activated based at least in part on the user interaction data 204. The user device 102 may be provided with a set of projector bars 110A-110D. Each projector bar may be provided at a corresponding edge of the display 104 and may include a plurality of projection elements 112.

The set of holographic projectors determined at block 306 may include some portion of the projection elements 112. In particular, based on the user interaction data 204, a subset of the projection elements 112 that at least partially coincide with the gaze direction of the user of the user device 102 and/or the direction of interaction 108 of the user with the user device 102 may be identified. This subset of the projection elements 112 may not be activated while all or some of the projection elements 112 that do not coincide with the gaze direction of the user and/or the direction of interaction 108 of the user with the user device 102 may constitute the set of holographic projectors to be activated. Referring to FIG. 1, for example, projection elements 112 forming part of the projection bar 110D may not be activated, while projection elements 112 forming part of the other projection bars 110A-110C may be activated.

At block 308 of the method 300, computer-executable instructions of the holographic projector activation module(s) 208 may be executed to activate the set of holographic projectors determined at block 306 to generate a holographic masking surface 210. The holographic masking surface 210 may be generated by activating all or some of the projection elements 112 that do not coincide with a gaze direction of the user of the user device 102 and/or the direction of interaction 108 of the user with the user device 102. An example holographic masking surface 114 is shown in FIG. 1. The holographic masking surface 114 forms a holographic security shield that secures the content 106 from the view of third parties, while at the same time, enabling a user of the user device 102 to continue to view the content 106 and interact with the display 104.

In certain example embodiments, the holographic masking surface 210 may only be generated if it is determined that a third party is viewing the display 104 or if there is a threshold likelihood that the display 104 is visible to a third party. For example, image sensors, proximity sensors, or the like may detect a gaze direction of a third party located proximate to the user device 102. Gaze direction data captured by such sensors may be provided as additional input data 206 to the holographic projector activation module(s) 208.

In such example embodiments, if the gaze direction of the third party is determined to at least partially coincide with the display 104, the holographic masking surface 210 may be generated. In other example embodiments, even if the gaze direction of the third party does not coincide with the display 104, the holographic masking surface 210 may nonetheless be generated if the content 106 being displayed is confidential in nature (as determined, for example, from metadata associated with the content). For example, the holographic masking surface 210 may be generated automatically when a confidential document is opened/launched. Further, in certain example embodiments, the set of holographic projectors may be deactivated and the holographic masking surface 210 dissolved if the content 106 being displayed transitions from confidential content to non-confidential content, even if the gaze direction of a third party at least partially coincides with the display 104.

In addition, in certain example embodiments, even if the gaze direction of a third party does not coincide with the display 104, the holographic masking surface 210 may nonetheless be generated if a third party is detected proximate to the user device 102 (e.g., within a threshold distance of the user device 102) and the content 106 being displayed is confidential. While example embodiments have been described in connection with confidential content, it should be appreciated that such example embodiments are also applicable to certain user interactions with the user device 102 such as gesture-based unlocking of the user device 102, login page accesses, or the like.

While example embodiments of the disclosure have been described in connection with projection elements 112 that are provided as part of the user device 102, it should be appreciated that, in certain example embodiments, the projection elements 112 may be provided within an environment in which the user device 102 is located. In such example embodiments, the user device 102 may communicate with a system (e.g., one or more servers or other devices) present in the environment to request the projection elements be activated when confidential content is being displayed on the display 104.

As previously noted, example embodiments of the disclosure also relate to adjusting one or more parameters of a holographic image that at least partially obscures an object of interest to enhance visibility of the object of interest to a user. FIG. 4 depicts an example scenario in which a hologram 406 is generated in air (or another suitable holographic medium). The hologram 406 may be opaque based on the brightness and density of the hologram 406. Thus, if the hologram 406 is generated between a user and an object of interest 402 to the user, the opaque hologram 406 may at least partially obscure the object of interest 402 from the user's view. The brightness and density of a hologram (e.g., luminous power density) may determine its opacity. For example, a less bright and/or less dense holographic image may be more transparent or semi-transparent than a holographic image that is brighter and/or more dense.

Referring now to FIGS. 4-6 in conjunction with one another, at block 602 of the method 600, computer-executable instructions of one or more user interaction detection modules 502—which may, in certain example embodiments, form part of a hologram human interface controller (HHIC)—may be executed to generate user interaction data 504. More specifically, image sensors, proximity sensors, or the like may be used to capture data indicative of a gaze direction, a focus direction, or the like of a user. The user interaction detection module(s) 502 may perform image analysis on the sensor data to generate the user interaction data 504.

At block 604 of the method 600, computer-executable instructions of one or more hologram parameter adjustment modules 508—which may, in certain example embodiments, form part of the HHIC—may be executed to determine, based at least in part on the user interaction data 504, that the gaze direction of the user at least partially coincides with the object of interest 402. The gaze direction of the user may be determined to at least partially coincide with the object of interest 402 if a gaze vector representing the gaze direction intersects the object of interest 402 in three-dimensional space. Referring to FIG. 4, this may indicate, for example, that the user is focused on the object of interest 402 rather than the hologram 406.

At block 606 of the method 600, computer-executable instructions of the hologram parameter adjustment module(s) 508 may be executed to determine that the object of interest 402 is at least partially obscured by the opaque hologram 406. The hologram 406 may be determined to at least partially obscure the object of interest 402 if, for example, the hologram 406 and the object of interest 402 at least partially occupy a same spatial plane.

Then, at block 608 of the method 600, computer-executable instructions of the hologram parameter adjustment module(s) 508 may be executed to adjust one or more parameters of a hologram to obtain a parameter-adjusted hologram 510. Referring to FIG. 4, for example, one or more parameters of the hologram 406 may be adjusted to obtain a hologram 408 that results in enhanced visibility of the object of interest 402 to the user. The parameter(s) that are adjusted may include a brightness parameter, a density parameter (e.g., a luminous power density), or the like. For example, a brightness level and/or a luminous power density of the opaque hologram 406 may be lowered to obtain a transparent or semi-transparent hologram 408. In certain example embodiments, a color, hue, contrast level, or the like of the hologram 406 may be varied with respect to time, spatial area, wavelength, or the like to, for example, transition from the opaque hologram 406 to the transparent/semi-transparent hologram 408. In certain example embodiments, a brightness level, luminous power density, or the like of the hologram 408 may be increased to increase the opacity of the hologram 408 if, for example, the gaze direction of a user shifts away from the object of interest 402 towards the hologram 408.

As previously noted, in certain example embodiments, a holographic image (e.g., the holograms 406, 408) may be generated as part of an HHIC. The holographic image may be a human interface region of space. For example, the holographic image may be a virtual device such as a push button, lever, slide-scale, or the like that a user may utilize to control a system that is communication with the HHIC. For example, the holographic image generated by the HHIC may be used to control settings (e.g., volume) on a television or computer; change channels; or perform any other suitable operational system function.

The HHIC may include image sensors or the like to determine when a user wishes to employ the HHIC. For example, as previously described, the HHIC may utilize the image sensors to determine whether a gaze direction of a user coincides with a holographic image or an object of interest that may be at least partially obscured by the holographic image. The HHIC may have at least two luminous density settings—a low setting in which the holographic image is substantially transparent or semi-transparent and a high setting in which the holographic image is substantially opaque. In certain example embodiments, the HHIC may provide the capability to adjust brightness, luminous power density, or other parameters across a continuous range from substantially opaque to substantially transparent.

The HHIC may adjust one or more parameters to make a holographic image more transparent when the user is not directly interacting with the HHIC (e.g., when a user's gaze direction does not coincide with a holographic image generated by the HHIC), and conversely, more opaque when the HHIC is in active mode and the user is directly interacting with the HHIC. Further, in certain example embodiments, a portion of a holographic image generated by the HHIC may be selectively variable with respect to opacity. That is, in certain example embodiments, only a portion of the holographic image may be variable with respect to opacity/transparency, while other portions of the holographic image may be set to a default opacity/transparency. Data indicative of the selectively variable regions of a holographic image and associated opacity/transparency settings may be provided as additional input data 506 to the hologram parameter adjustment module(s) 508.

For example, a user may selectively set a portion of a holographic image that is in direct view of a television (or other system being controlled via the HHIC) to a certain transparency level, while other portions of the holographic image may remain at a set-point opacity. It should be appreciated that in such example embodiments the transparency of the variable region of the holographic image may change based on the gaze direction of the user. For example, the variable region of the holographic image may return to the set-point opacity of the non-variable regions of the holographic image when the user's gaze direction does not coincide with the object of interest 402.

In certain example embodiments, in addition to gaze direction of a user, contextual analysis of speech, body movements, or the like may also be performed to determine whether a user is actively interacting with a holographic image or an object of interest that is at least partially obscured by the holographic image. As such, an HHIC in accordance with example embodiments of the disclosure may include a microphone or any other suitable sensors in addition to image sensors. Further, contextual analysis of speech, body movements, or the like may also be performed to identify an optimum position for a holographic image that minimizes (or eliminates) obstruction of the object of interest 402. Data indicative of the results of such contextual analysis may be provided as additional input data 506 to the hologram parameter adjustment module(s) 508.

As previously noted, example embodiments of the disclosure also relate to the use of holographic images to represent a digital object transfer. FIG. 7 depicts a user device 702 and a user device 704. The user device 702 and the user device 704 may be referred to hereinafter as a sending device 702 and a receiving device 704, respectively. Referring now to FIGS. 7-9 in conjunction with one another, at block 902 of the method 900, user input may be received at the sending device 702. The user input may be indicative of a selection of a digital object for transfer to the receiving device 704. The digital object may be a text file, an audio file, a video file, an image file, or the like.

At block 904 of the method 900, computer-executable instructions of one or more spatial attribute determination modules 802—which may reside, for example, on the sending device 702 or on one or more devices present in an ecosystem/environment in which the sending device 702 is located—may be executed to generate spatial attribute data 804 based at least in part on at least one of a distance or a relative orientation between the sending device 702 and the receiving device 704. For example, the spatial attribute data 804 may indicate a distance between the sending device 702 and the receiving device 704, a relative orientation of the devices, and so forth. In certain example embodiments, the receiving device 704 may not be within a line-of-sight of the sending device 702. In such example embodiments, the spatial attribute data 804 may indicate default/programmable spatial attributes (e.g., angle, distance, etc.) for the remote receiving device, which may be used to generate a holographic image of the receiving device, as will be described in more detail later in this disclosure.

At block 906 of the method 900, computer-executable instructions of one or more transition path determination modules 806—which may reside, for example, on the sending device 702 or on one or more devices present in an ecosystem/environment in which the sending device 702 is located—may be executed to determine a transition path 810 based at least in part on the spatial attribute data 804. In certain example embodiments, the transition path 810 may have a default trajectory/shape (e.g., parabolic, straight line, etc.), while in other example embodiments, the transition path 810 may be customizable by the user. An example parabolic transition path 710 is shown in FIG. 7. Further, in certain example embodiments, the transition path 810 may be required to satisfy certain requirements based on the type of holographic image that is generated to represent the digital object being transferred. For example, if the holographic image representative of the digital object is a vehicle, the transition path 810 may be required to extend along a ground surface.

At block 908 of the method 900, computer-executable instructions of one or more holographic image data generation modules 814—which may reside, for example, on the sending device 702 or on one or more devices present in an ecosystem/environment in which the sending device 702 is located—may be executed to generate holographic image data 816 based at least in part on the transition path 810. The holographic image data 816 may include data indicative of a first holographic image to be generated to represent the digital object being transferred as well as data indicative of a second holographic image to be generated to represent the transition path 810. Further, in those example embodiments in which the receiving device 704 is located remotely (e.g., not within a line-of-sight) of the sending device 702, the holographic image data 816 may further include data indicative of a third holographic image to be generated to represent the remote receiving device 704.

Any of the first, second, or third holographic images mentioned above may be generated by the sending device 702 or by one or more devices present in the ecosystem/environment. In certain example embodiments, the processes described herein for representing a transfer of a digital object using holographic images—if implemented by device(s) present in the ecosystem/environment may be provided as a service to users.

Any of the first, second, or third holographic images may be generated from any of a variety of sources including, without limitation, an icon or brand image, a photo, a default or standard image, a user image, or the like. In certain example embodiments, the user may be provided with the capability to select a holographic image that will be used to represent the digital object being transferred from stock images, upload a custom image, or the like. In other example embodiments, the sending device 702 (or any ecosystem device) may select a default holographic image to represent the digital object. The default image that is selected may correspond to a type of digital object being transferred. For example, if an audio file is being transferred, the device may select an image of a record as a default image. In other example embodiments, the holographic image selected to represent the digital object may be representative of an attribute of the digital object. For example, if the digital object is an image of a toy, a holographic image of that toy (or some generic toy) may be generated. As another example, if the digital object is a text file topically related to vehicle, a holographic image of a vehicle may be generated. It should be appreciated that the above examples are illustrative and not exhaustive.

In certain example embodiments, the user may also be provided with a capability to select from default holographic images to represent the transition path and/or the receiving device 704 (when it is remote) or customize their own images. In addition, various other attributes of any of the holographic images may be adjustable/programmable by the user. For example, any of the holographic images may be scalable to a desired size by the user. As another example, a color, hue, shape, or the like of a holographic image may be customizable by the user. It should be appreciated that the above examples are illustrative and not exhaustive. Further, any of the programmable/user-selectable/default inputs described above may be provided to the holographic image data generation module(s) 814 as additional input data 812.

At block 910 of the method 900, computer-executable instructions of the holographic image data generation module(s) 814 may be executed to send the holographic image data 816 to one or more holographic projectors 818 present in the ecosystem/environment to project the first holographic image representative of the digital object being transferred and a second holographic image representative of the transition path.

Referring to FIG. 7, example holographic projector(s) 706(1)-706(N) are shown. While the holographic projectors 706(1)-706(N) are depicted and described as being provided within the ecosystem/environment, it should be appreciated that in other example embodiments, the holographic projectors may be provided as part of the sending device 702. A first holographic image 708 representative of the digital object being transferred is also depicted in FIG. 7 as being projected onto a second holographic image representative of the transition path 710. Further, while not shown in FIG. 7, if the receiving device 704 is located remotely from the sending device 702, a third holographic image representative of the receiving device 704 may be projected at or near an endpoint of the second holographic image representing the transition path 710. A position of the third holographic image with respect to the sending device 702 may be determined based on default spatial attributes identified from the spatial attribute data 804.

The first holographic object 708 may move along the transition path 710 substantially concurrently with the transfer of the digital object from the sending device 702 to the receiving device 704. That is, the distance between the first holographic image 708 and an endpoint of the second holographic image representing the transition path 710 may decrease proportionately with the amount of time left to complete the transfer of the digital object. In particular, the sending device 702 (or another device present in the ecosystem/environment) may determine a data transfer rate for the digital object. Based on the data transfer rate and a size of the digital object being transferred, the device may estimate the remaining time to completion of the transfer and modify a position of the first holographic image 708 along the transition path 710 accordingly, at block 912.

In certain example embodiments, the ratio of the length of the transition path 710 traversed by the first holographic image 708 to a total length of the transition path 710 may represent a percentage of the digital object that has been transferred from the sending device 702 to the receiving device 704. In other example embodiments, the total time for transfer of the digital object may be estimated based on an initial data transfer rate, and the estimated time for completion of the transfer may be determined based on an instantaneous data transfer rate that may be periodically determined. The first holographic object 708 may then be caused to transition along the transition path 710 such that at any given point along the transition path 710 the ratio of the length of the transition path 710 traversed by the first holographic image 708 to a total length of the transition path 710 may represent the estimated time to completion of the transfer in relation to the total time for completion that was initially estimated. It should be appreciated that the first holographic image 708 may not move linearly across the transition path 710, but rather may move non-linearly as the data transfer rate changes. After transfer of the digital object is complete, the receiving device 704 may optionally send a confirmation to the sending device 702. This may be a user-selectable feature.

In certain example embodiments, a relative position/distance of the receiving device 704 with respect to the sending device 702 may be monitored. If a relative distance, a relative position, and/or a relative orientation of the receiving device 704 changes with respect to the sending device 702, computer-executable instructions of the spatial attribute determination module(s) 802 may be executed to generate updated spatial attribute data reflecting the new relative distance, relative position, and/or relative orientation of the receiving device 704 with respect to the sending device 702. This updated spatial attribute data may be provided as input to the transition path determination module(s), which may be executed to determine an updated transition path between the sending device 702 and the receiving device 704. Computer-executable instructions of the holographic image data generation module(s) 814 may then be executed to generate updated holographic image data indicative of at least the updated transition path, and this updated holographic image data may be fed to the holographic projection(s) 818 to cause a holographic image of the updated transition path to be generated.

Further, in certain example embodiments, various enhancements to any of the holographic images may be provided. For example, a holographic image may be required to satisfy certain requirements based on the type of image or the underlying digital object that it represents. For instance, a holographic image of a vehicle may be required to travel along a transition path on a ground surface. As another example, a holographic image may be enhanced with auditory data. For instance, if the holographic image is representative of an audio file being transferred, at least a portion of the audio file may be played as the file is being transferred and the holographic image travels along the transition path. As another example, if the holographic image is a vehicle, a vehicle sound may be played. It should be appreciated that the above examples are merely illustrative and not exhaustive.

In addition, in certain example embodiments, a user-selectable/programmable setting may be provided to cause the first holographic image 708 to navigate around or ignore physical obstacles that may be present along the transition path 710. For example, if a desk is located between the sending device 702 and the receiving device 704, and the transition path 710 is located along a ground surface, the transition path 710 may curve around the desk, or alternatively, may extend for a portion along the desk in a disjointed manner.

In addition, in certain example embodiments, the transition path 810 and/or the rate at which the first holographic image representative of the digital object being transferred traversed the transition path 810 may be determined based on the speed and/or direction of a gesture applied to the sending device 702 by a user of the device 702.

Example embodiments of the disclosure provide various technical features, technical effects, and/or improvements to technology. For instance, example embodiments of the disclosure provide the technical effect of improving the security of content displayed on a user device. This technical effect is achieved at least in part by the technical feature of selectively activating projection elements to project a holographic masking surface around a display of the user device that obscures the content from the view of a third party while at the same time permitting the content to be viewed by a user of the user device. The holographic masking surface may be generated when content being displayed is tagged as confidential and/or a gaze direction of a third party coincides with the display, thereby providing an improvement to the functioning of a computer with respect to content security.

Example embodiments of the disclosure also provide the technical effect of improved user interaction with holographic images projected into three-dimensional space. This technical effect is achieved at least in part by the technical feature of adjusting the opacity/transparency of a holographic image based at least in part on whether a user is focused on the holographic image or an object of interest that is at least partially obscured by the holographic image. This technical feature results in an improvement to the functioning of a computer with respect to holographic image generation.

Example embodiments of the disclosure also provide the technical effect of improved digital object transfers between devices. This technical effect is achieved at least in part by the technical feature of utilizing a holographic image to represent a digital object being transferred between devices as well as a holographic image to represent a transition path traversed by the holographic image representing the digital object. In this manner, an enhanced visual representation of digital object transfers is provided to users of both a sending device and a receiving device. In addition, the above-described technical effect is also achieved at least in part by the technical feature of generating a holographic image to represent the receiving device if the receiving device is not within a line-of-sight of the sending device. These technical features result in the improvement of the functioning of a computer with respect to digital object transfers.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 10:
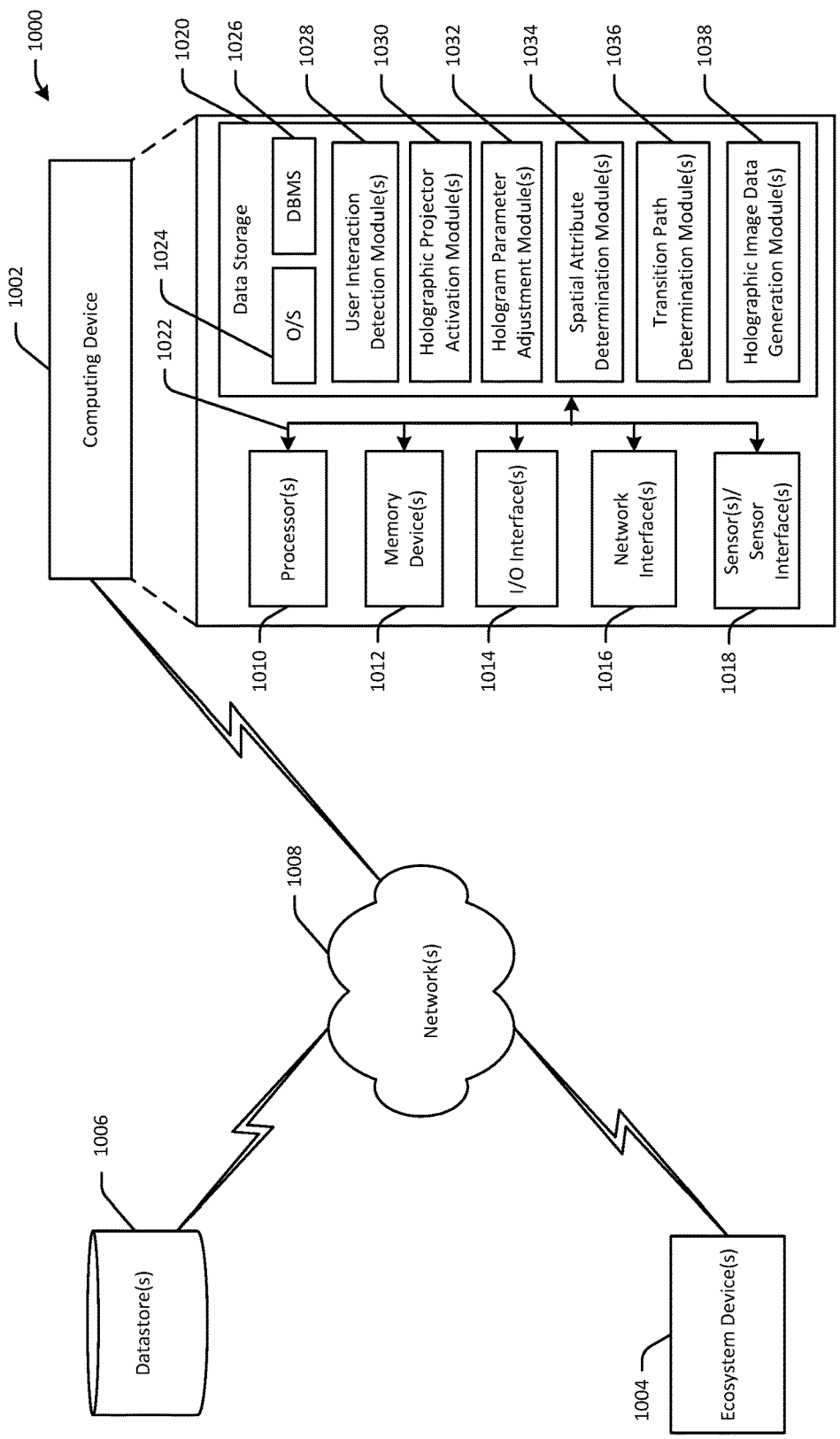
FIG. 10 is a schematic diagram of an illustrative networked architecture configured to implement one or more example embodiments of the disclosure.

FIG. 10 is a schematic diagram of an illustrative networked architecture 1000 configured to implement one or more example embodiments of the disclosure. The illustrative architecture 1000 may include an example computing device 1002 and one or more ecosystem devices 1004. The example computing device 1002 may represent an illustrative configuration of the user device 102, the user device 702, or the like. The ecosystem device(s) 1004 may include one or more devices configured to implement any of the functionality described herein (including functionality illustratively described in connection with the user device 102, the user device 702, or the like). For example, the ecosystem device(s) 1004 may include device(s) configured to secure content displayed on a user device; device(s) configured to adjust opacity/transparency of a holographic image (e.g., the HHIC described earlier); device(s) configured to utilize holographic images to represent a transfer of digital object; or the like. The ecosystem device(s) 1004 may additionally, or alternatively, include any number of holographic projectors provided within an ecosystem/environment.

The computing device 1002 may be configured to communicate with the ecosystem device(s) 1004 and/or one or more data store(s) 1006 over one or more networks 1008.

The network(s) 1008 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 1008 may have any suitable communication range associated therewith and may include, for example, global networks (e.g., the Internet), metropolitan area networks (MANs), wide area networks (WANs), local area networks (LANs), or personal area networks (PANs). In addition, the network(s) 1008 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1002 may include one or more processors (processor(s)) 1002, one or more memory devices 1012 (generically referred to herein as memory 1012), one or more input/output ("I/O") interface(s) 1014, one or more network interfaces 1016, one or more sensors/sensor interfaces 1018, and data storage 1020. The computing device 1002 may further include one or more buses 1022 that functionally couple various components of the computing device 1002.

The bus(es) 1022 may include at least one of a system bus, a memory bus, an address bus, or a message bus, and may permit the exchange of information (e.g., data (including computer-executable code), signaling, etc.) between various components of the computing device 1002. The bus(es) 1022 may include, without limitation, a memory bus or a memory controller, a peripheral bus, an accelerated graphics port, and so forth. The bus(es) 1022 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1012 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1012 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1012 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1012 and the data storage 1020, removable and/or non-removable, are examples of computer-readable storage media (CRSM) as that term is used herein.

The data storage 1020 may store computer-executable code, instructions, or the like that may be loadable into the memory 1012 and executable by the processor(s) 1010 to cause the processor(s) 1010 to perform or initiate various operations. The data storage 1020 may additionally store data that may be copied to memory 1012 for use by the processor(s) 1010 during the execution of the computer-executable instructions. Moreover, output data generated as a result of execution of the computer-executable instructions by the processor(s) 1010 may be stored initially in memory 1012 and may ultimately be copied to data storage 1020 for non-volatile storage.

More specifically, the data storage 1020 may store one or more operating systems (O/S) 1024; one or more database management systems (DBMS) 1026 configured to access the memory 1012 and/or the external data store(s) 1006; and one or more program modules, applications, engines, computer-executable code, scripts, or the like such as, for example, one or more user interaction detection modules 1028, one or more holographic projector activation modules 1030, one or more hologram parameter adjustment modules 1032, one or more spatial attribute determination modules 1034, one or more transition path determination modules 1036, and one or more holographic image data generation modules 1038. Any of the components depicted as being stored in data storage 1020 may include any combination of software, firmware, and/or hardware. The software and/or firmware may include computer-executable instructions (e.g., computer-executable program code) that may be loaded into the memory 1012 for execution by one or more of the processor(s) 1010 to perform any of the operations described earlier in connection with similarly named program modules. While the computing device 1002 is illustratively shown as containing program modules configured to implement any of the example embodiments described herein, it should be appreciated that some program modules may not be present in certain example embodiments. For example, if the computing device is configured to implement digital object transfer using holographic images (as described in connection with user device 702), only the spatial attribute determination module(s) 1034, the transition path determination module(s) 1036, and the holographic image data generation module(s) 1038 may be provided among the modules depicted.

Although not depicted in FIG. 10, the data storage 1020 may further store various types of data utilized by components of the computing device 1002 (e.g., content metadata indicating whether the content is confidential; user settings; holographic image data; holographic opacity/transparency settings; spatial attribute data; transition path data; etc.). Any data stored in the data storage 1020 may be loaded into the memory 1012 for use by the processor(s) 1010 in executing computer-executable instructions. In addition, any data stored in the data storage 1020 may potentially be stored in the external data store(s) 1006 and may be accessed via the DBMS 1024 and loaded in the memory 1012 for use by the processor(s) 1010 in executing computer-executable instructions.

The processor(s) 1010 may be configured to access the memory 1012 and execute computer-executable instructions loaded therein. For example, the processor(s) 1010 may be configured to execute computer-executable instructions of the various program modules, applications, engines, or the like of the computing device 1002 to cause or facilitate various operations to be performed in accordance with one or more embodiments of the disclosure. The processor(s) 1010 may include any suitable processing unit capable of accepting data as input, processing the input data in accordance with stored computer-executable instructions, and generating output data. The processor(s) 1010 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1010 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1010 may be capable of supporting any of a variety of instruction sets.

Referring now to other illustrative components depicted as being stored in the data storage 1020, the O/S 1024 may be loaded from the data storage 1020 into the memory 1012 and may provide an interface between other application software executing on the computing device 1002 and hardware resources of the computing device 1002. More specifically, the O/S 1024 may include a set of computer-executable instructions for managing hardware resources of the computing device 1002 and for providing common services to other application programs. In certain example embodiments, the O/S 1024 may include or otherwise control execution of one or more of the program modules depicted as being stored in the data storage 1020. The O/S 1024 may include any operating system now known or which may be developed in the future including, but not limited to, any server operating system, any mainframe operating system, or any other proprietary or non-proprietary operating system.

The DBMS 1026 may be loaded into the memory 1012 and may support functionality for accessing, retrieving, storing, and/or manipulating data stored in the memory 1012, data stored in the data storage 1020, and/or data stored in the external data store(s) 1006. The DBMS 1026 may use any of a variety of database models (e.g., relational model, object model, etc.) and may support any of a variety of query languages. The DBMS 1026 may access data represented in one or more data schemas and stored in any suitable data repository. The external data store(s) 1006 that may be accessible by the computing device 1002 via the DBMS 1026 may include, but are not limited to, databases (e.g., relational, object-oriented, etc.), file systems, flat files, distributed data stores in which data is stored on more than one node of a computer network, peer-to-peer network data stores, or the like. In certain example embodiments, the DBMS 1026 may be a lightweight DBMS designed for a mobile device.

Referring now to other illustrative components of the computing device 1002, the input/output (I/O) interface(s) 1014 may facilitate the receipt of input information by the computing device 1002 from one or more I/O devices as well as the output of information from the computing device 1002 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1002 or may be separate. The I/O devices may further include, for example, any number of peripheral devices such as data storage devices, printing devices, and so forth.

The I/O interface(s) 1014 may also include an interface for an external peripheral device connection such as universal serial bus (USB), FireWire, Thunderbolt, Ethernet port or other connection protocol that may connect to one or more networks. The I/O interface(s) 1014 may also include a connection to one or more antennas to connect to one or more of the network(s) 1006 via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 1002 may further include one or more network interfaces 1016 via which the computing device 1002 may communicate with any of a variety of other systems, platforms, networks, devices, and so forth. The network interface(s) 1016 may enable communication, for example, with the ecosystem device(s) 1004 and/or the data store(s) 1006 via the network(s) 1008.

It should be appreciated that the program modules depicted in FIG. 10 as being stored in the data storage 1020 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 1002, hosted locally on an ecosystem device 1004, and/or hosted on other computing device(s) accessible via the network(s) 1008, may be provided to support functionality provided by the modules depicted in FIG. 10 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of servers in the computing device 1002 in accordance with any suitable computing model such as, for example, a client-server model, a peer-to-peer model, and so forth. In addition, any of the functionality described as being supported by any of the modules depicted in FIG. 10 may be implemented, at least partially, in hardware and/or firmware across any number of devices.

It should further be appreciated that the computing device 1002 and/or an ecosystem device 1004 may include alternate and/or additional hardware, software, or firmware components beyond those described or depicted without departing from the scope of the disclosure. More particularly, it should be appreciated that software, firmware, or hardware components depicted as forming part of the computing device 1002 or an ecosystem device 1004 are merely illustrative and that some components may not be present or additional components may be provided in various embodiments. While various illustrative modules have been depicted and described as software modules stored in data storage 1020, it should be appreciated that functionality described as being supported by such modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 300, 600, or 900 may be performed by a computing device 1002 having the illustrative configuration depicted in FIG. 10 and/or by an ecosystem device 1004, or more specifically, by one or more program modules, engines, applications, or the like executing on such a system or device. It should be appreciated, however, that such operations may be implemented in connection with numerous other device configurations.

The operations described and depicted in the illustrative methods of FIGS. 3, 6, and 9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3, 6, or 9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for controlling parameters of a holographic image, the method comprising:
   detecting a gaze direction of a user;
   generating user interaction data indicative of the gaze direction of the user;
   determining, based at least in part on the user interaction data, that the gaze direction of the user at least partially coincides with an object of interest;
   determining that the object of interest is at least partially obscured by the holographic image; and
   adjusting one or more of the parameters of the holographic image to enhance visibility of the object of interest to the user, wherein adjusting one or more of the parameters of the holographic image comprises adjusting a power density of the holographic image with respect to at least one of time, spatial area, or color.

2. The computer-implemented method of claim 1, wherein adjusting one or more of the parameters of the holographic image further comprises adjusting a brightness of the holographic image.

3. The computer-implemented method of claim 1, further comprising:
   determining, based at least in part on the user interaction data, that the gaze direction of the user has shifted towards the holographic image; and
   adjusting the one or more of the parameters of the holographic image to enhance visibility of the holographic image to the user.

4. The computer-implemented method of claim 1, further comprising:
   identifying a first portion of the holographic image that does not obscure the object of interest; and
   maintaining a first portion of the power density that corresponds to the first portion of the holographic image at a predetermined luminous power density.

5. The computer-implemented method of claim 4, further comprising:
   identifying a second portion of the holographic image that at least partially obscures the object of interest,
   wherein adjusting the power density of the holographic image comprises reducing a second portion of the power density that corresponds to the second portion of the holographic image to a level below the predetermined luminous power density of the first portion of the holographic image.

6. The computer-implemented method of claim 1, further comprising:
   determining a spatial position of the holographic image that minimizes a portion of the holographic image that obscures the object of interest; and
   causing the holographic image to be projected at the spatial position.

7. A system for controlling parameters of a holographic image, the system comprising:
   at least one memory storing computer-executable instructions; and
   at least one processor configured to access the at least one memory and execute the computer-executable instructions to:
   detect a gaze direction of a user;
   generate user interaction data indicative of the gaze direction of the user;
   determine, based at least in part on the user interaction data, that the gaze direction of the user at least partially coincides with an object of interest;
   determine that the object of interest is at least partially obscured by the holographic image; and
   adjust one or more of the parameters of the holographic image to enhance visibility of the object of interest to the user, wherein the at least one processor is configured to adjust one or more of the parameters of the holographic image by executing the computer-executable instructions to adjust a power density of the holographic image with respect to at least on of time, spatial area, or color.

8. The system of claim 7, wherein the at least one processor is further configured to adjust one or more of the parameters of the holographic image by executing the computer-executable instructions to adjust a brightness of the holographic image.

9. The system of claim 7, wherein the at least one processor is further configured to execute the computer-executable instructions to:
determine, based at least in part on the user interaction data, that the gaze direction of the user has shifted towards the holographic image; and
adjust the one or more of the parameters of the holographic image to enhance visibility of the holographic image to the user.

10. The system of claim 7, wherein the at least one processor is further configured to execute the computer-executable instructions to:
identify a first portion of the holographic image that does not obscure the object of interest; and
maintain a first portion of the power density that corresponds to the first portion of the holographic image at a predetermined luminous power density.

11. The system of claim 10, wherein the at least one processor is further configured to execute the computer-executable instructions to:
identify a second portion of the holographic image that at least partially obscures the object of interest,
wherein the at least one processor is configured to adjust one or more of the parameters of the holographic image by executing the computer-executable instructions to reduce a second portion of the power density that corresponds to the second portion of the holographic image to a level below the predetermined luminous power density of the first portion of the holographic image.

12. The system of claim7, wherein the at least one processor is further configured to execute the computer-executable instructions to:
determine a spatial position of the holographic image that minimizes a portion of the holographic image that obscures the object of interest; and
cause the holographic image to be projected at the spatial position.

13. A computer program product for controlling parameters of a holographic image, the computer program product comprising a non-transitory storage medium readable by a processing circuit, the non-transitory storage medium storing instructions executable by the processing circuit to cause a method to be performed, the method comprising:
detecting a gaze direction of a user;
generating user interaction data indicative of the gaze direction of the user;
determining, based at least in part on the user interaction data, that the gaze direction of the user at least partially coincides with an object of interest;
determining that the object of interest is at least partially obscured by the holographic image; and
adjusting one or more of the parameters of the holographic image to enhance visibility of the object of interest to the user, wherein adjusting one or more of the parameters of the holographic image comprises adjusting a power density of the holographic image with respect to at least one of time, spatial area, or color.

14. The computer program product of claim 13, wherein adjusting one or more of the parameters of the holographic image further comprises adjusting a brightness of the holographic image.

15. The computer program product of claim 13, the method further comprising:
determining, based at least in part on the user interaction data, that the gaze direction of the user has shifted towards the holographic image; and
adjusting the one or more of the parameters of the holographic image to enhance visibility of the holographic image to the user.

16. The computer program product of claim 13, the method further comprising:
identifying a first portion of the holographic image that does not obscure the object of interest; and
maintaining a first portion of the power density that corresponds to the first portion of the holographic image at a predetermined luminous power density.

17. The computer program product of claim 16, the method further comprising:
identifying a second portion of the holographic image that at least partially obscures the object of interest,
wherein adjusting one or more of the parameters of the holographic image comprises reducing a second portion of the power density corresponds to the second portion of the holographic image to a level below the predetermined luminous power density of the first portion of the holographic image.

* * * * *